(12) United States Patent
Bultitude et al.

(10) Patent No.: US 8,264,816 B2
(45) Date of Patent: Sep. 11, 2012

(54) EXTERNALLY FUSED AND RESISTIVELY LOADED SAFETY CAPACITOR

(75) Inventors: John Bultitude, Greenville, SC (US); John E. McConnell, Pelzer, SC (US)

(73) Assignee: Kemet Electronics Corporation, Greenville, SC (US)

(*) Notice: Subject to any disclaimer, the term of this patent is extended or adjusted under 35 U.S.C. 154(b) by 413 days.

(21) Appl. No.: 12/545,887

(22) Filed: Aug. 24, 2009

(65) Prior Publication Data
US 2011/0043963 A1     Feb. 24, 2011

(51) Int. Cl.
*H01G 2/00*     (2006.01)
(52) U.S. Cl. ............ 361/321.4; 361/738; 361/763; 361/766; 361/767; 361/782
(58) Field of Classification Search ............ 361/738, 361/763, 766, 767, 782, 833
See application file for complete search history.

(56) References Cited

U.S. PATENT DOCUMENTS

| 4,193,106 A | 3/1980 | Coleman | 361/275 |
| 7,164,573 B1 | 1/2007 | Prymak | 361/321.2 |
| 2006/0114639 A1 | 6/2006 | Barber et al. | 361/321.1 |
| 2006/0114640 A1 | 6/2006 | Barber et al. | 361/321.1 |
| 2008/0026136 A1 | 1/2008 | Skamser et al. | 427/79 |

FOREIGN PATENT DOCUMENTS

DE    10224565    * 12/2003

OTHER PUBLICATIONS

International Search Report and Written Opinion of the International Searching Authority, PCT/US2010/046555. Apr. 28, 2011, Sang Min Lee.

* cited by examiner

*Primary Examiner* — Tuan T Dinh
*Assistant Examiner* — Hung Dang
(74) *Attorney, Agent, or Firm* — Joseph T. Guy; Nexsen Pruet, LLC

(57) ABSTRACT

A capacitor with a combined with a resistor and/or fuse is described. This safe capacitor can rapidly discharge through the resistor when shorted. The presence of a fuse in series with the capacitor and results in a resistive failure when this opens during and overcurrent condition. Furthermore, the presence of a resistor in parallel to the capacitor allows the energy to be rapidly dissipated when a failure occurs.

40 Claims, 12 Drawing Sheets

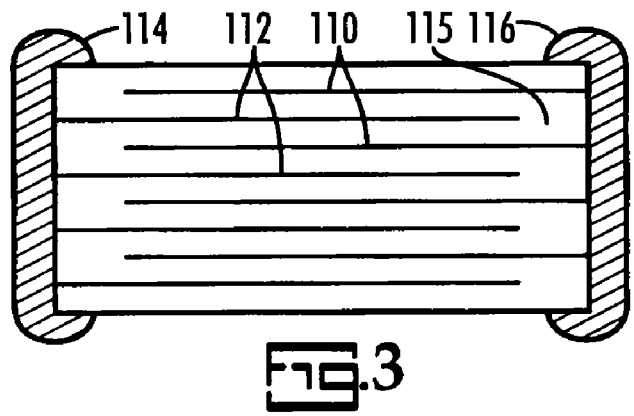
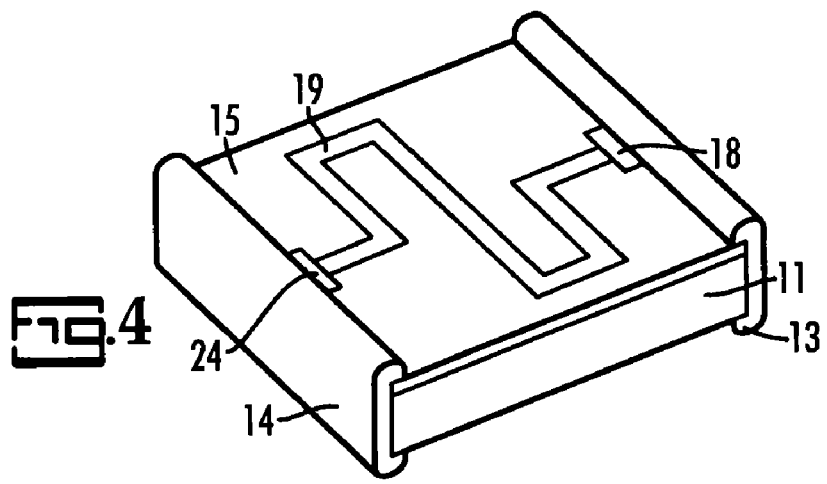
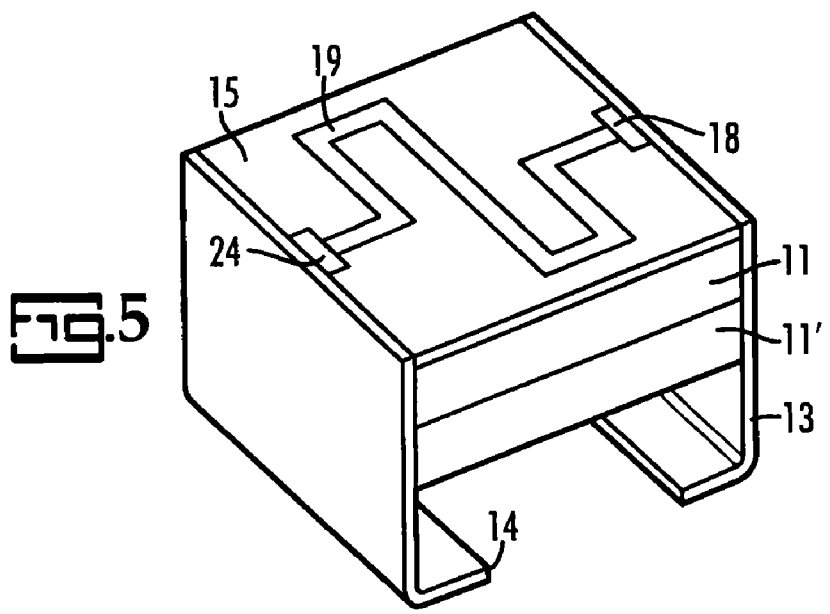

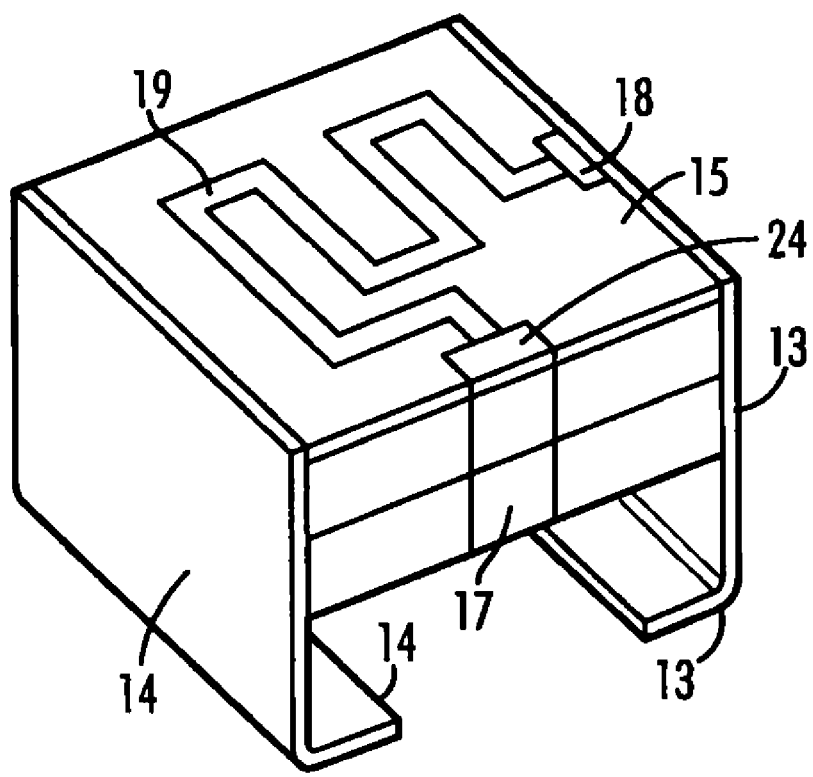
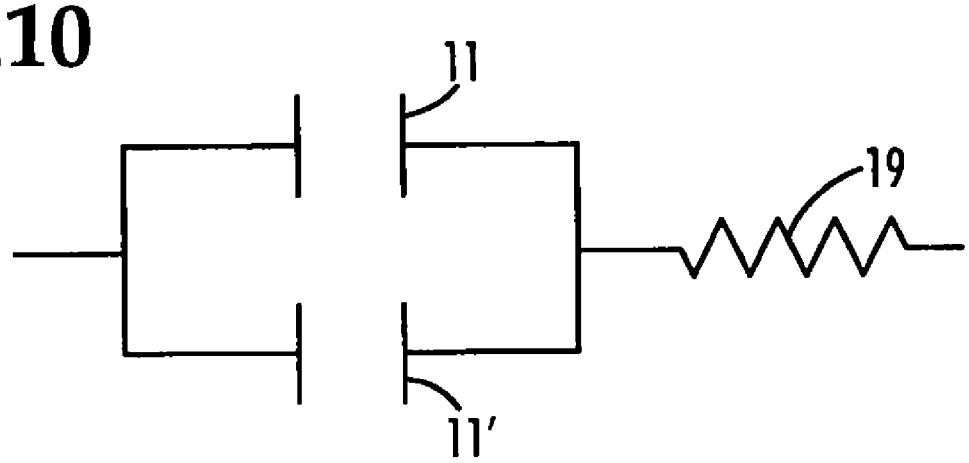

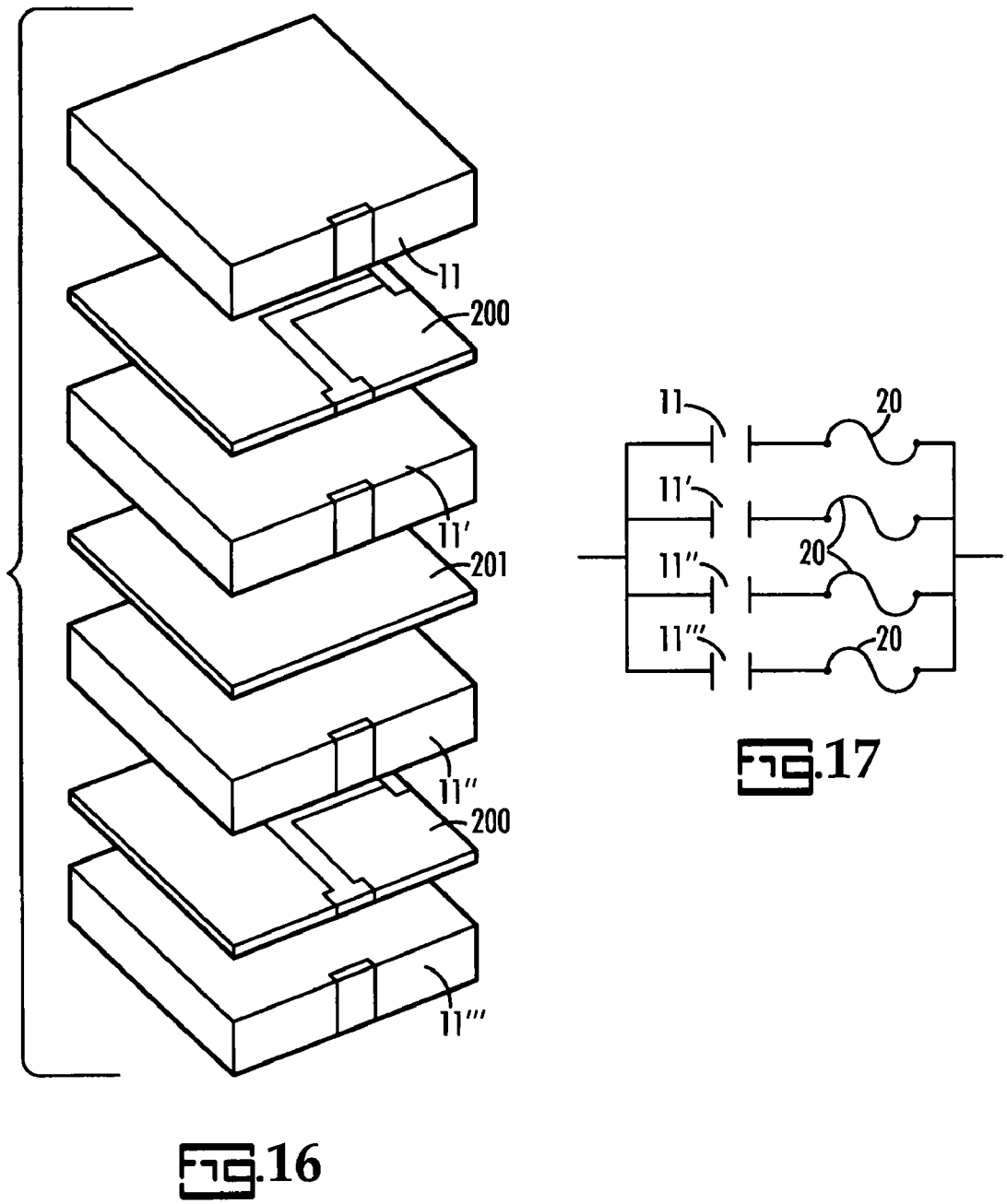

EXTERNALLY FUSED AND RESISTIVELY LOADED SAFETY CAPACITOR

BACKGROUND OF INVENTION

The present invention is related to a capacitor with integral components, preferably, resistors and fuses, wherein failure of the capacitor results in a resistively loaded or protected circuit.

Capacitors are utilized in virtually every electronic circuit and their function is well documented. As with any electronic component capacitors are not immune to failure. Failures can be caused by physical strain, by electrical overloads, or by a myriad of other causes. In cases where capacitor failure is due to an internal short, or an electrical overload, the failure itself can cause damage to the remaining circuit or the failure eliminates protection of the remaining circuit from subsequent events. If capacitor failure results in a direct short, for example, the dampening effect on the remaining circuit is lost resulting in potential un-dampened high loads. Designs have been developed that allow the capacitor to fail in an open mode, thus minimizing the opportunity for a direct short and creating an open in the circuit. This failure mode renders the capacitor non-functional but does protect the circuit from an overload condition. However, certain open mode failures, caused by cracked capacitors as an example, when exposed to voltage, can result in metal migration creating an intermittent open or short over time. It is known that voltage in the presence of humidity results in an increased rate of metal migration accelerating the failure.

Fuses and resistors have been incorporated into capacitors in the past as indicated in U.S. Pat. Nos. 7,165,573 and 4,193,106. Different metallization technologies exist that can be utilized to integrate the use of a resistor or fuse with the capacitor. Each technology has its own advantages and disadvantages which have to be considered in order to make the most advantageous choice. One such technology is referred to in the art as "thin film metallization". Thin film metallization is based on vapor deposition of materials onto a surface. Circuits are then created by successive steps of masking, imaging, and etching. This process is the mainstay of semiconductor manufacturing which is a batch operation. It is cost prohibitive when utilized to generate circuits one part at a time.

Thick film technology is also known. Thick film technology is based on materials which are conductive, resistive, or insulative in nature being formed into a paste that is applied to a surface in desired patterns by means of a printer, such as a screen printer. The paste is placed in a particular location to create a desired circuit pattern. Thick film technology can be utilized in different approaches. One is to apply the metallization directly to the surface of the capacitor as taught in U.S. Pat. No. 7,164,573 which is commonly assigned. U.S. Pat. No. 7,164,573 describes formation of a resistor or a fusible link in series with a capacitor on the surface of the capacitor utilizing thick film technology. The current carrying capabilities of the fusible link can be adjusted by varying the length and cross sectional area of the conductive link itself. The resistor value can be adjusted by its cross sectional area and length, the resistivity of the ink itself, or by using a laser to actually trim the resistor.

Implementing the cited prior art is difficult for, at least, two reasons. The first is that printing the required conductive traces as well as the functional components onto the surface of a capacitor requires each capacitor be printed individually, or in multiples, that require special tools and requires the thickness of all the capacitors to be held within a tolerance of +/−0.003 inches in order to minimize part to part conductor thickness variation. This requires an extensive amount of parts handling, tooling and automation. Special tooling is required to properly locate each capacitor at each printing step, thus requiring a high level of capitalization. The second issue is that thick film materials are designed to be fired in an air atmosphere. This is compatible with Precious Metal Electrodes (PME) but not Base Metal Electrodes (BME). PME, typically utilizing palladium and silver, are cost prohibitive in many cases. BME systems, which typically utilize nickel, are dramatically less expensive and are therefore preferred. Unfortunately, BME systems must be fired in a reducing atmosphere in order to keep the nickel from oxidizing. Therefore, the practice of utilizing thick film technology is limited to a small mix of products that utilizes the PME electrode system and cannot be applied to BME electrode systems because of the incompatibility of the air fired material systems. Even in the case of PME systems the thick film materials have to be carefully matched to the capacitor materials for them to function.

For the reasons set forth above, the art lacks a thick film material system that is compatible to both the PME and BME material systems.

SUMMARY OF THE INVENTION

It is an object of the present invention to provide a means of adding functionality to a capacitor utilizing materials which are compatible and easily integrated with material technologies commonly used for capacitor construction.

It is a particular object of the present invention to provide a capacitor which fails in a resistive loaded circuit configuration and which can be manufactured at a reasonable cost using current manufacturing practices.

A particular feature of the present invention is the ability to utilize a substrate to create a functional safe circuit that can be incorporated with a single MLCC capacitor or multiple capacitors of either PME or BME metallization technologies in a stacked format thereby providing a unique solution to a common problem.

A particular advantage is that the present invention allows temperature stable BME capacitors to be combined with ceramic safe circuits to provide reliable performance at elevated temperatures above about 200° C.

A particular advantage of the present invention is that the invention offers a great deal of design flexibility since different types of safe circuits can now be incorporated on the substrate and integrated with the capacitors at an affordable cost. In its simpler form, a resistor of lower resistance than the capacitor can be provided parallel to the capacitor to allow for a controlled discharge over a shorter time period.

These and other advantages, as will be realized, are provided in a safe capacitor with a resistive load failure mode. The safe capacitor has a first external termination, an internal termination and a second external termination. At least one capacitive unit comprising a first conductor and a second conductor with a first lead is connected to the first conductor and a second lead is connected to the second conductor wherein the first lead is electrically connected to the first external termination and the second lead is connected to the internal termination. At least one safe circuit is attached to the capacitor element wherein the safe circuit comprises a third lead and a fourth lead and wherein the third lead is connected to the internal termination and the fourth lead is connected to the second external termination. The safe circuit comprises a fuse and a resistor in parallel between the third lead and the fourth lead.

Yet another embodiment is provided in an electrical circuit protected against overload. The circuit comprises a circuit trace. A safe capacitor is attached to the circuit trace wherein the safe capacitor has a first external termination, an internal termination and a second external termination. At least one capacitive unit comprising a first conductor and a second conductor with a first lead connected to the first conductor and a second lead connected to the second conductor. The first lead is electrically connected to the first external termination and the second lead is connected to the internal termination. A safe circuit is attached to the capacitor element wherein the safe circuit comprises a third lead and a fourth lead and wherein the third lead is connected to the internal termination and the fourth lead is connected to the second external termination and the safe circuit comprises a fuse and a resistor in parallel between the third lead and the fourth lead. When exposed to an excessive current the fuse opens thereby converting the safe circuit to a resistive circuit.

Yet another embodiment is provided in a method for manufacturing a safe capacitor. The method includes:
providing at least one capacitive unit comprising alternating conductive plates of opposing polarity separated by a dielectric wherein first plates of the alternating conductive plates are in electrical contact with a first termination and second plates of the alternating conductive plates are in electrical contact with a second termination; providing a safe circuit comprising a third terminal and a fourth terminal with a fuse and a resistor in electrical parallel between the third terminal and the fourth terminal; orienting the capacitive units to form a stack of capacitive units;
attaching the safe circuit to the stack of capacitive units wherein the third terminal is in electrical contact with the second termination to form a safe capacitor precursor; attaching external terminations to the safe capacitor precursor wherein a first external termination is in electrical contact with the first termination and a second external termination is in electrical contact with the fourth terminal.

A particularly preferred embodiment is provided by having the resistor connected in parallel to the capacitor to allow for rapid discharge with a fuse in series to open in an overcurrent condition resulting in a resistive failure.

BRIEF DESCRIPTION OF DRAWINGS

FIG. 3 illustrates a cross section of an MLCC.

FIG. 4 illustrates an embodiment of the invention.

FIG. 5 illustrates an embodiment of the invention.

FIG. 9 illustrates an embodiment of the invention.

FIG. 10 is an electrical schematic diagram of the embodiment of FIG. 9.

FIG. 16 illustrates an exploded view of the embodiment of FIG. 15.

FIG. 17 illustrates an electrical schematic diagram of the embodiment of FIG. 15.

DESCRIPTION OF THE INVENTION

The present invention is directed to an improved capacitor with integral components, most preferably resistors and fuses, linked collectively or individually in parallel or series with the capacitor. The improved capacitor mitigates damage which occurs upon catastrophic failure of the capacitive component and provides a means for rapidly discharging a capacitor.

The invention will be described with reference to the figures forming an integral part of the present application. Throughout the various figures similar elements may be numbered accordingly.

More specifically, provided herein is a monolithic stacked multilayer ceramic capacitor (MLCC) within a lead frame that incorporates a ceramic substrate containing a resistor, fuse or combination thereof that is connected in parallel, or series, to one or more capacitors in a discrete unit. The use of a ceramic substrate offers a relatively cost effective way of combining these functionalities without having to match the different materials and processes required for integration at the device level. Furthermore, by using a 3- or 4-terminal MLCC design in combination with the safe circuit substrate the resistor and/or fuse functionalities can be combined in series with one or more capacitors to provide protection from overcurrent that may result from damage to one or more MLCC's. By combining the fuse in series with a capacitor in parallel with a lower resistance resistor the resulting stack fails in a high resistance mode when the fuse blows and the energy stored in the capacitor is more rapidly dissipated through the resistor. This technology combines the robustness of a lead frame with this additional safety feature for the most demanding applications.

Figure 1:
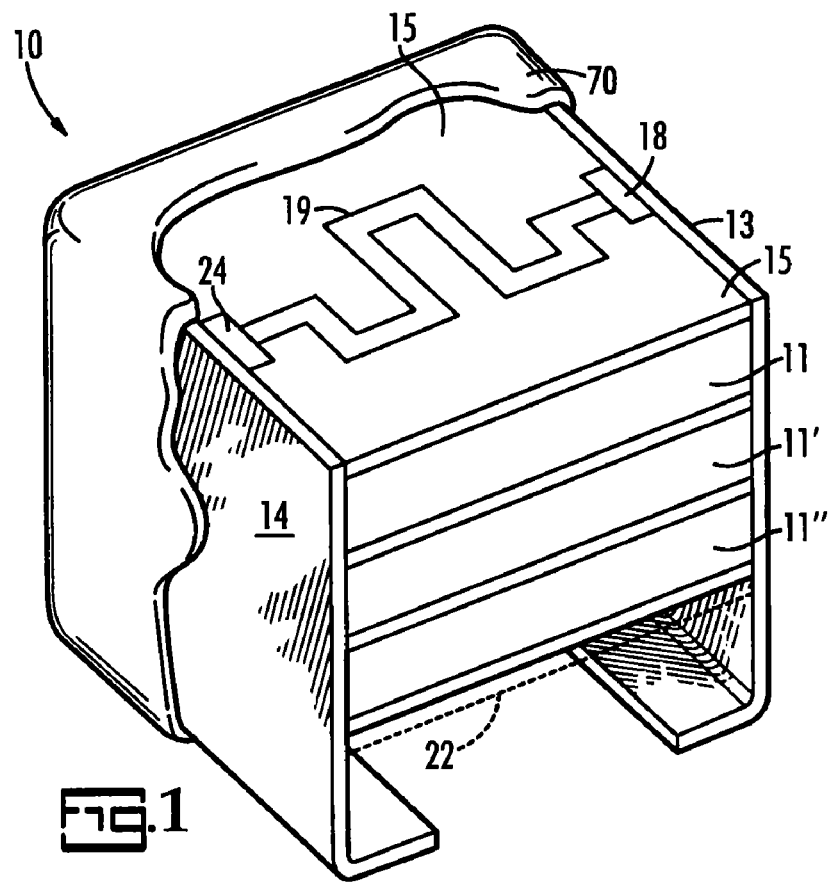
FIG. 1 illustrates an embodiment of the present invention in perspective view.

An embodiment of the safe circuit design is illustrated FIG. 1 as incorporated in a conventionally designed and constructed MLCC. In FIG. 1, a resistive component, illustrated as the preferred resistor, 19, has its first terminal connected to a capacitor lead, 14, via a contact pad, 24. The resistor's second terminal is connected to a second capacitor lead, 13, via pad, 18. The first capacitor lead and second capacitor lead are of opposing polarity. In the embodiment illustrated in FIG. 1 the resistor is terminated to a conventionally designed capacitor and the resistor is in electrical parallel with the capacitor. One terminal of the resistor is connected to pad 24 which connects to the capacitors termination and lead 14 and the second resistor terminal is connected to pad 18 which is connected to the capacitor's termination and lead 13. By placing the resistor in parallel with the capacitor, a charged capacitor can be discharged over a period of time as determined by the resistance value of the resistor. In the case of high voltage or harsh environments the capacitor may be encased in a non-conducting resin, 70, except for the lower extent of the external terminations where the capacitor is connected to a circuit trace. In less demanding environments, the capacitor may not be encased in a non conducting resin. The embodiment of FIG. 1 illustrates three MLCC's, 11, provided in a stack between common leads, 13 and 14. An alternative location for the safe circuit, or a location for a second safe circuit, is designated 22. While a resistor is preferred other components can be substituted therefore with the proviso that the component(s) in parallel with the capacitor have sufficient resistance to avoid an electrical short at operating voltages. For the purposes of the present invention components with a resistance sufficient to prohibit electrical shorts at operating voltage are referred to as resistive components.

Figure 2:
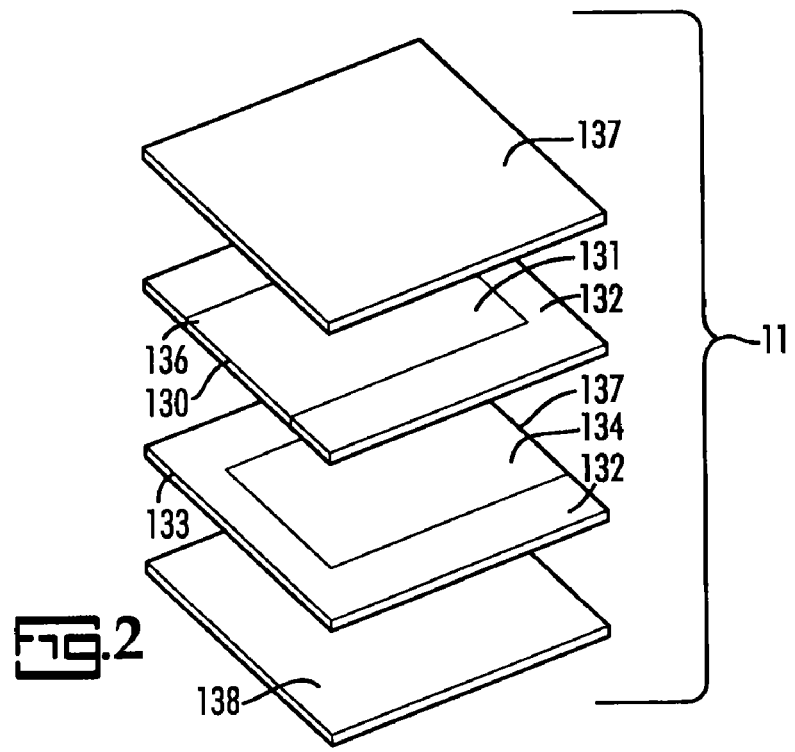
FIG. 2 illustrates the layers which are taken together to form an MLCC.

An exploded view of a multi-layer capacitive unit is illustrated in FIG. 2. In FIG. 2, the capacitive unit, 11, comprises a plurality of layers wherein conductor electrodes and dielectric layers are alternately stacked to form capacitive couples between conductor electrodes separated by a dielectric. Every other conductive electrode has common polarity with adjacent conductive electrodes having opposing polarity. In FIG. 2, first plates, 130, comprising a first electrode, 131, on a dielectric, 132, are alternately combined with second plates, 133, comprising a second electrode, 134, on a dielectric, 132. The first electrode of each first plate terminates at an edge, 136, which is ultimately electrically connected to a first external terminal (14 in FIG. 1, for example) to form an external termination. Likewise, each second electrode of each second plate terminates at an edge, 137, which is ultimately electrically connected to a second external termination (13 in FIG. 1, for example) to form an external termination of opposing polarity to the first external termination. Though only one first plate and one second plate are illustrated in FIG. 2 it is well known that a large number of plates would typically be employed. The stack of first and second plates are preferably covered by a top cover sheet, 137, and lower cover sheet, 138. The stack of layers are laminated together to form the finished capacitive unit, 11.

An MLCC is illustrated in cross-section view in FIG. 3. The MLCC comprises first electrodes, 110, which terminate at a first external termination, 116. A second set of electrodes, 112, which are interleaved with the first electrodes terminate at a second external termination, 114. The first and second electrodes are separated by a dielectric, 115.

Figure 6:
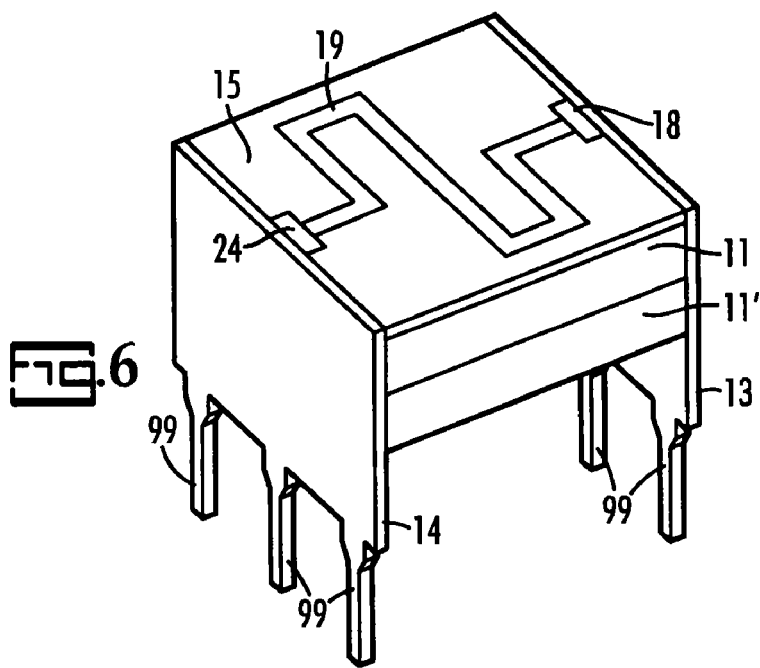
FIG. 6 illustrates an embodiment of the invention.

The embodiment of FIG. 1 can be employed in a number of configurations as illustrated in FIGS. 4, 5 and 6.

The embodiment illustrated in FIG. 4 is known in the industry as a leadless surface mount. In the leadless surface mount the leads, 13 and 14, of the capacitor, 11, are in electrical contact with the pads, 18 and 24, of the safe circuit. The leads are then mounted directly on traces of a circuit board.

The embodiment illustrated in FIG. 5 is referred to in the art as a leaded surface mount capacitor and is particularly suitable for a stack of MLCC's. In FIG. 5 two MLCC's are illustrated without limit thereto. The smart circuit and each MLCC are in electrical contact with leads, 13 and 14.

The embodiment illustrated in FIG. 6 is referred to as a leaded through hole mount capacitor. This embodiment is similar to the embodiment of FIG. 6 except that the leads comprise extensions, 99, which extend into, or through, vias in a substrate.

Throughout the instant specification various embodiments are illustrated in a configuration which is conducive to an explanation of the invention without limit thereto. It would be realized that the instant invention could be utilized in either of the surface mount configurations, the through hole configuration, combinations thereof or other configurations without deviation from the metes and bounds of the invention.

Figure 7:
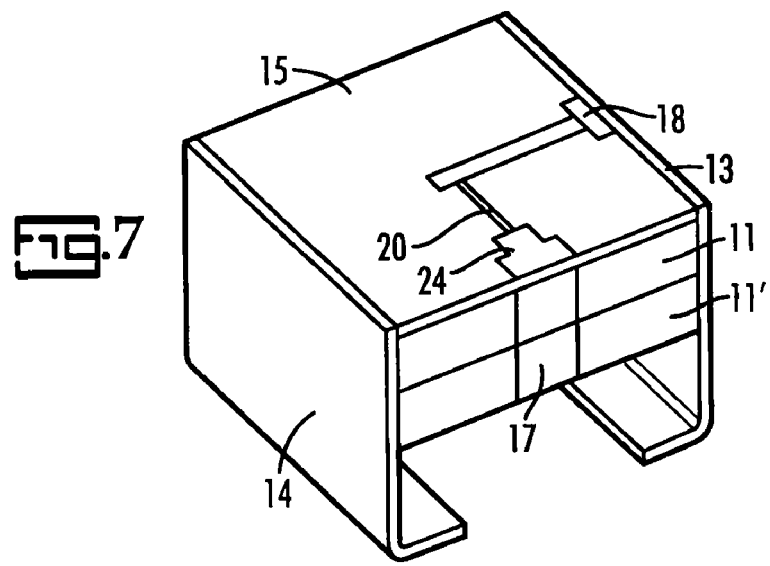
FIG. 7 illustrates an embodiment of the invention.

An embodiment of the invention is illustrated in perspective view in FIG. 7. In FIG. 7, a pair of MLCC's, 11 and 11', are mounted in a leaded surface mount configuration with a smart circuit on a substrate, 15, mounted therewith. Each MLCC is in electrical contact with external termination, 14, and internal termination, 17. A conductive component which is illustrated as the preferred fuse, 20, is in series with the capacitors. On one side the fuse, 20, is electrically connected to tab, 24, which is in turn electrically connected to internal termination, 17. The other side of the fuse, 20, is electrically connected to external terminal, 13, through tab, 18. The embodiment of FIG. 7, though illustrated in a leaded surface mount configuration, could be incorporated into a leadless surface mount configuration or a leaded through hole configuration as would be realized by one of skill in the art. Though illustrated as a fuse the conductive component can be a resistive component or a combination of components as will be realized.

Figure 8:
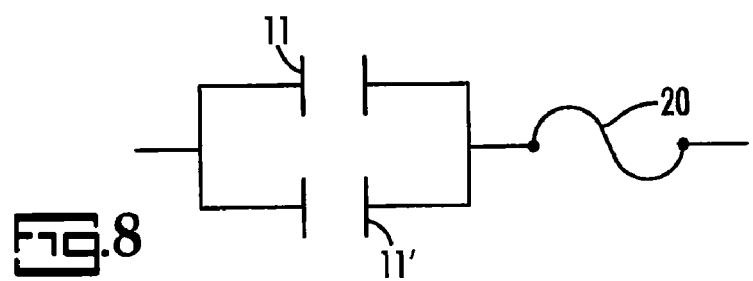
FIG. 8 is an electrical schematic diagram of the embodiment of FIG. 7.

An electrical schematic diagram of the embodiment of FIG. 7 is provided in FIG. 8. As seen in FIG. 8 the capacitors are in a parallel arrangement with both in series with a fuse, 20. It would be readily appreciated that the number of parallel capacitors is not particularly limited in the instant invention. It would also be appreciated that the fuse can be substituted by a conductive component or a resistive component.

An embodiment of the invention is illustrated in FIG. 9. The embodiment of FIG. 9 is similar to the embodiment of FIG. 7 except that the capacitors are parallel and in series with a resistive component illustrated as a resistor, 19. The embodiment of FIG. 9, though illustrated in a leaded surface mount configuration, could be incorporated into a leadless surface mount configuration or a leaded through hole configuration as would be realized by one of skill in the art.

An electrical schematic diagram of the embodiment of FIG. 9 is provided in FIG. 10. As seen in FIG. 10 the capacitors, 11, are in a parallel arrangement with both in series with the resistor, 19. It would be readily appreciated that the number of parallel capacitors is not particularly limited in the instant invention. It would be realized that the resistor can be substituted by a conductive component or a resistive component.

In one embodiment it is preferable to have at least one of a resistor or fuse in series with the capacitor. In this embodiment a 3 terminal MLCC is preferred as illustrated in FIG. 11.

A particular advantage of the invention is the flexibility. As illustrate in FIG. 11, the first terminal of a resistive component, most preferable a resistor, is connected to pad, 24, via conductor, 21, which connects to the capacitor termination or lead, 14. The second resistive component terminal is connected to pad, 18, and connected to the capacitor's external lead, 13, and the capacitors internal lead, 17, via conductor, 22, and pad, 16. The embodiments illustrated in FIGS. 1 and 11 allow the capacitor's stored charge to be dissipated over a period of time as determined by the resistance value of the resistor by placing the resistor in parallel with the capacitor. Once assembled, the safe capacitor is suitable for the next level of assembly into an electronic module. The safe capacitor may also be encased, as described elsewhere herein, for use in harsh environmental and or in high voltage applications. In applications requiring encasement, the safe capacitor may be encased in a non-conducting material except for the lower extent of the external terminations where the safe capacitor is to be mounted to a circuit trace. An optional conductive component, and most preferably a fuse, could be incorporated into conductor, 22, or conductor, 21, if desired.

Figure 11:
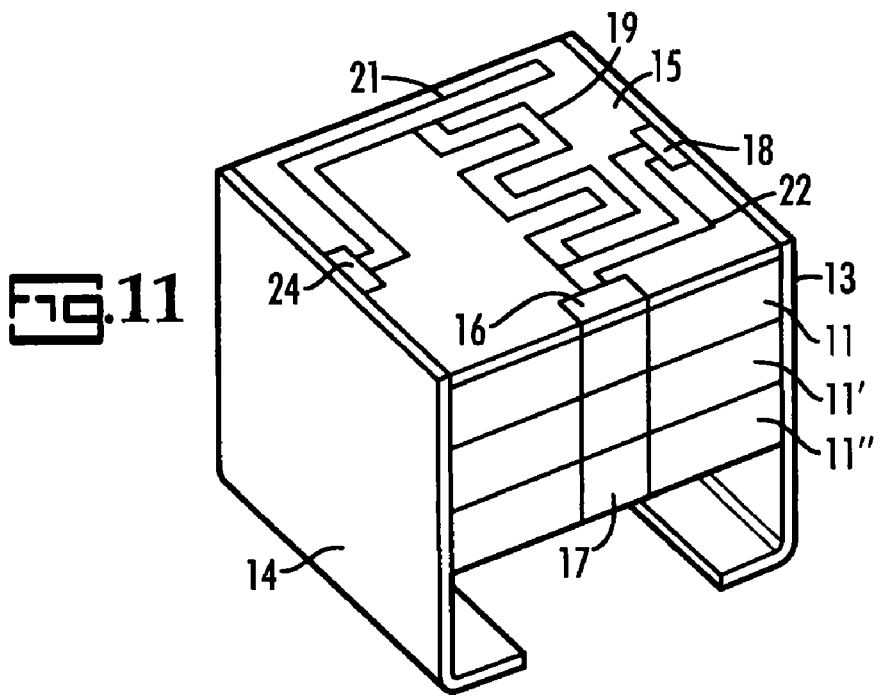
FIG. 11 illustrates an embodiment of the invention.

While the embodiment of FIG. 11 is illustrated in a leaded surface mount configuration it could be incorporated into a leadless surface mount configuration or a through hole configuration as would be readily realized.

Figure 12:
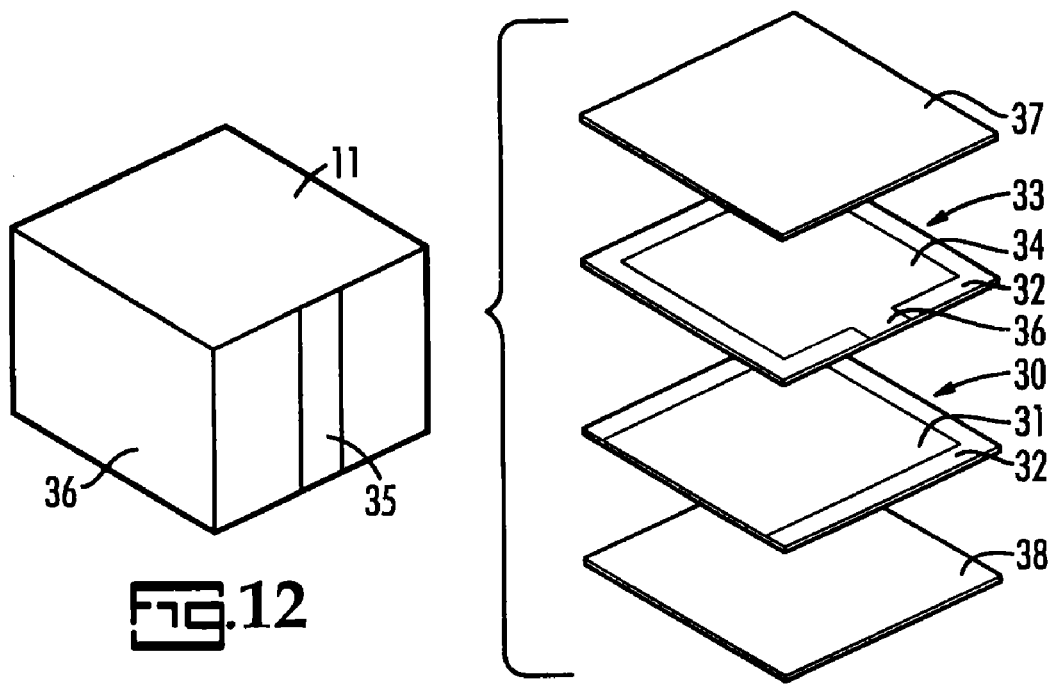
FIG. 12 illustrates an embodiment of the invention in exploded view.

An exploded view of a multi-layer capacitive unit is illustrated in FIG. 12. In FIG. 12, the capacitive unit, 11, comprises a plurality of layers wherein conductor electrodes and dielectric layers are alternately stacked to form capacitive couples between conductor electrodes separated by a dielectric. Every other conductive electrode has common polarity with adjacent conductive electrodes having opposing polarity. In FIG. 12, first plates, 30, comprising a first electrode, 31, on a dielectric, 32, are alternately combined with second plates, 33, comprising a second electrode, 34, on a dielectric, 32. The first electrode of each first plate terminates at an edge, 36, which is ultimately electrically connected to a first external terminal (14 in FIG. 11 for example) to form an external termination. Likewise, a conductive tab, 35, of each second electrode of each second plate is connected to an internal terminal (17 in FIG. 11, for example) to form an internal termination of opposing polarity to the first external termination. Though only one first plate and one second plate are illustrated in FIG. 12 it is well known that a large number of plates would typically be employed. The stack of first and second plates are preferably covered by a top cover sheet, 37, and lower cover sheet, 38. The stack of layers are laminated together to form the finished capacitive unit, 11. The embodiment illustrated in FIG. 12 is simplified for discussion purposes. It would be understood by one of ordinary skill in the art that multiple terminations on one, or both, plates could be utilized. These additional terminals may serve to adjust electrical properties such as electrical series resistance of the capacitor. However, it should be noted that the 3-terminal design is most preferred since it allows the fuse or resistor in the safe circuit to be combined in series with the capacitor. In this preferred orientation if there is a misalignment of the capacitors, or circuit, during assembly of the stack it will not pass final electrical inspection. It is therefore preferred to retain this manufacturing "error proof" feature in any 4 or more terminal version of this invention. In cases where 4 or more terminals are required, the terminal location should not be symmetrical to ensure "error proofing".

Figure 13:
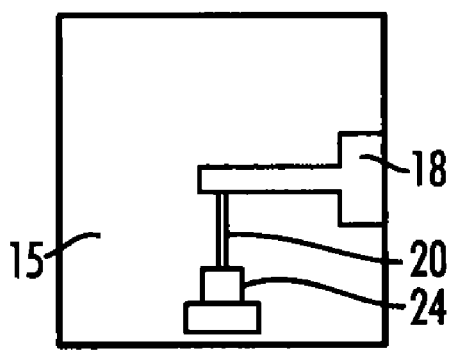
FIGS. 13 and 14 illustrate a double sided safe circuit.
Figure 14:
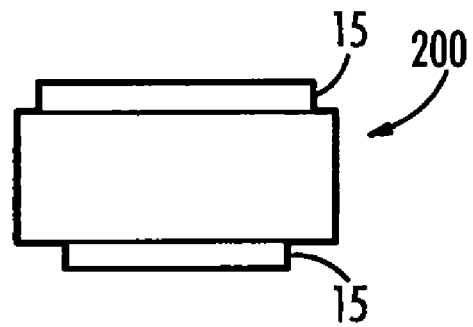

A safe circuit of the invention is illustrated in FIG. 13 which is particularly suitable for use with a 3 terminal MLCC with a fuse or resistor in series with the capacitor stack. The safe circuit comprises a fuse chip having circuitry and a fuse, 20, on the top side between pads, 18 and 24. The embodiment also has a mirror image circuit on the chip's back side as illustrated in FIG. 14. In the embodiment illustrated in FIG. 14 a resistive component or conductive component could be substituted for the fuse on one or both faces. The double sided embodiment is particularly suitable for use between MLCC's in a stack as will be further described herein.

Figure 15:
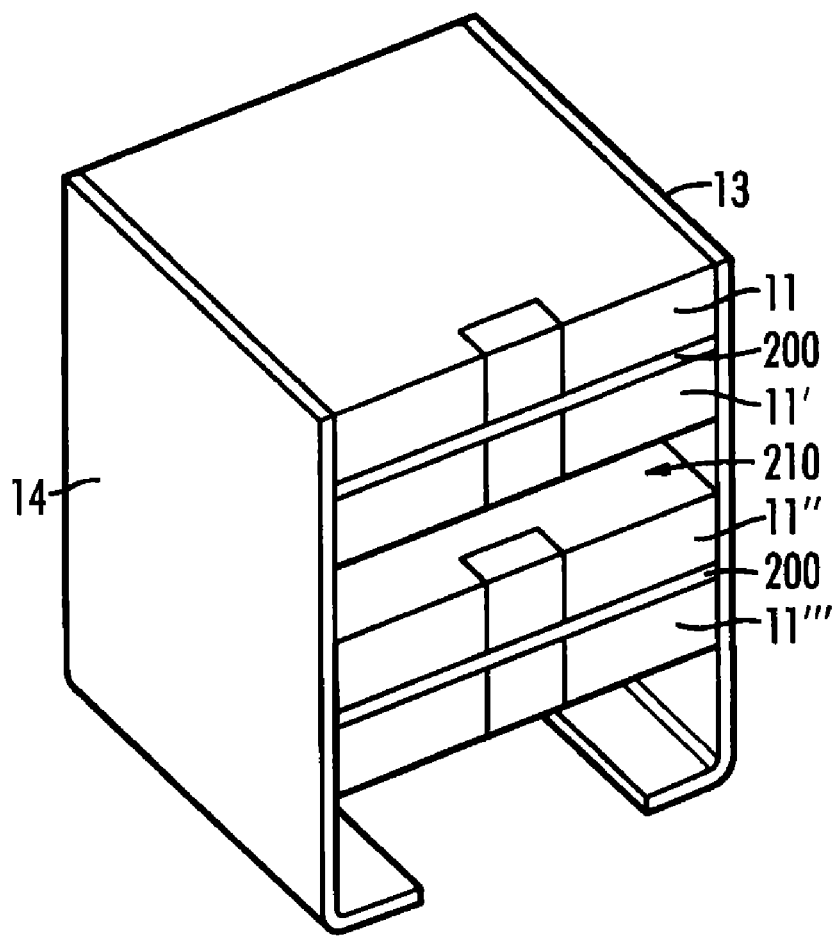
FIG. 15 illustrates an embodiment of the invention.

An embodiment of the invention is illustrated in FIG. 15 wherein double sided safe circuits, as illustrated in FIGS. 13 and 14, are used to place a component such as a fuse, or resistor, in series with each capacitor that is stacked and in electrical parallel with one another. The double sided chip is placed between pairs of capacitors and each stack of paired capacitors and smart circuit is then placed into a stack. In one embodiment a gap, 210, can be between each pair of stacked capacitors thus eliminating the contacts of one stack making inappropriate electrical contact with another stack. Also an insulating film or dielectric could be used in place of the gap. While the embodiment of FIG. 15 is illustrated in a leaded surface mount configuration it could be incorporated into a leadless surface mount configuration or a through hole configuration as would be readily realized.

An embodiment of the invention is illustrated in exploded view in FIG. 16. In FIG. 16 a pair of MLCC's, 11, sandwich a smart circuit, 200. The stacked MLCC's and smart circuit can be separated by a spacer, 201, if preferred or they can be separated by a space to avoid electrical contact.

An electrical schematic diagram of the embodiment of FIG. 15 is provided in FIG. 17. The capacitors, 11, are in parallel and each capacitor is in series with a resistive component or conductive component illustrated as the preferred fuse, 20.

Figure 18:
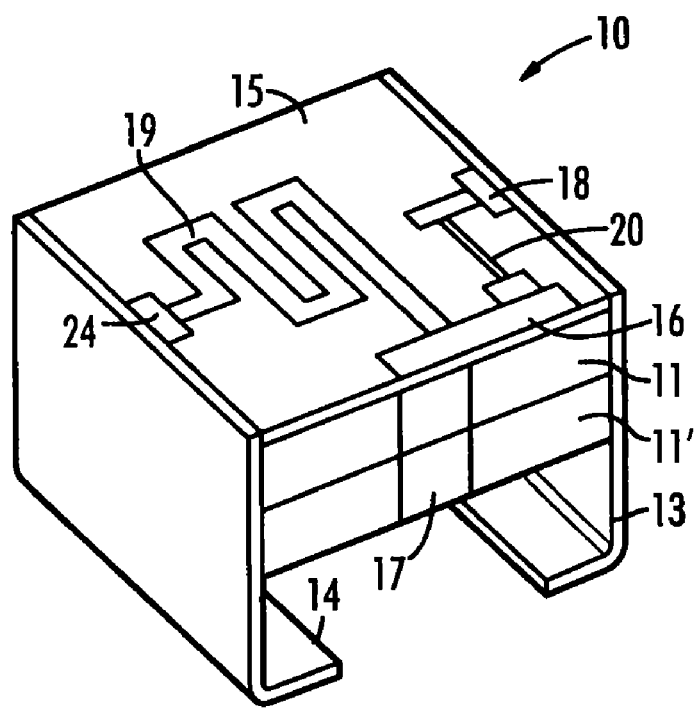
FIG. 18 illustrates an embodiment of the present invention in perspective view.

An embodiment of the invention is illustrated in FIG. 18. In FIG. 18, the smart capacitor, 10, comprises a multiplicity of MLCC's, 11, stacked with common termination at an external lead, 14, and an internal lead, 17. A resistive component illustrated as the preferred resistor, 19, mounted on a substrate, 15, is in electrical connection with the external lead, 14, and the internal lead, 17, via pads, 24 and 16. A conductive component illustrated as the preferred fuse, 20, is in electrical connection with the internal lead, 17, and the other external lead, 13, via pads, 16 and 18. The embodiment illustrated in FIG. 18 provides MLCC's in parallel with a resistor and the stack in series with a fuse as further explained with reference to FIG. 19. While the embodiment of FIG. 18 is illustrated in a leaded surface mount configuration it could be incorporated into a leadless surface mount configuration or a through hole configuration as would be readily realized.

Figure 19:
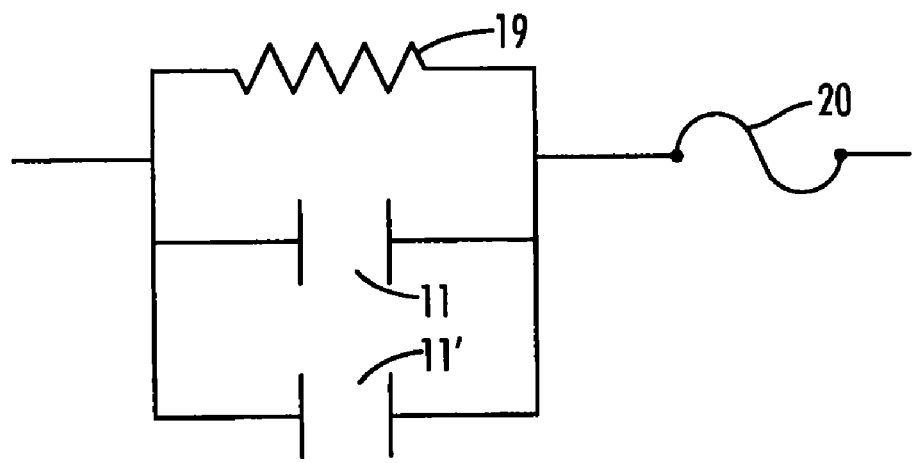
FIG. 19 is an electrical schematic diagram of the embodiment of FIG. 18.

A schematic electrical diagram of the embodiment illustrated in FIG. 18 is provided in FIG. 19. In FIG. 19 a multiplicity of MLCC's, 11, are in parallel with a resistive component illustrated as the preferred resistor, 19. The MLCC's and resistive component are then in series with a conductive component illustrated as the preferred fuse, 20.

Figure 20:
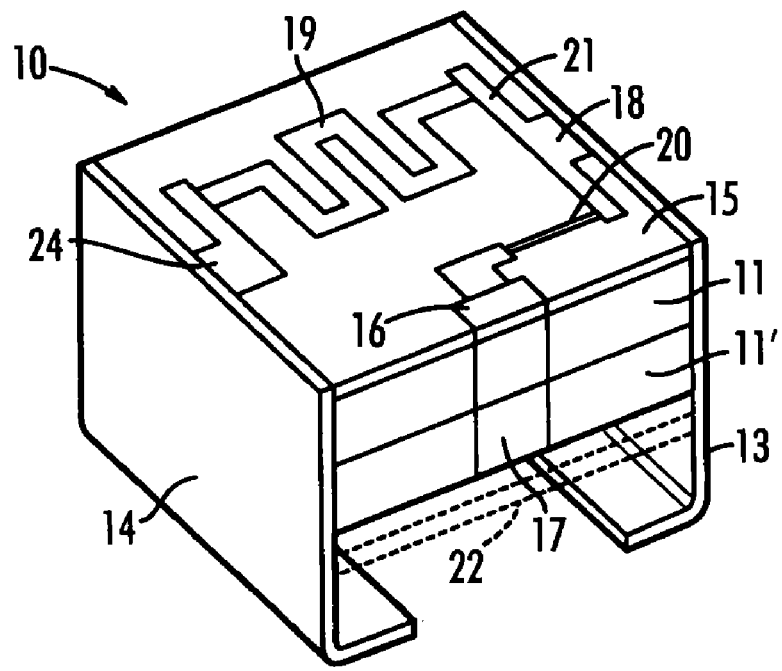
FIG. 20 illustrates an embodiment of the invention in perspective view.

An embodiment of the invention is illustrated in FIG. 20 wherein the capacitor, 10, has an external lead, 14, and an internal lead, 17, and a second external lead, 13. The internal lead, 17, is connected through pad, 16, and in series with a fuse, 20, and connected to the external lead, 13, via contact pad, 18. A resistor, 19, is connected in parallel with the conductive component. The resistor has the first termination connecting the external lead, 13, via contact pad, 18. The second termination of resistor, 19, is connected to the capacitor external lead, 14, via contact pad, 24. The advantage of this circuit design is that when a capacitor fails causing a high current condition the fuse, 20, will open and the resulting energy stored in the capacitor will be dissipated rapidly through the resistor, 19, and into external lead, 14. This also protects the surrounding components from damage and resulting failure due to a catastrophic capacitor failure. FIG. 20 also shows the resistor and fuse being on the same safe circuit substrate. To add another level of protection, the resistor can be placed on a separate substrate and positioned anywhere in the stack of capacitors to protect the resistor from potential damage when the fuse blows. This feature and added capability further supports the advantages of this invention and its versatility to add additional functionality to a capacitor or stack of capacitors as well as providing additional levels of safeguards for protecting circuitry in the event of a capacitor failure. Additional conductors, 21 and 24, are illustrated and can be employed for connectivity if desired. An alternative location for the smart circuit is illustrated at 22. Alternatively, a second smart circuit could be inserted at 22 if desired.

Figure 21:
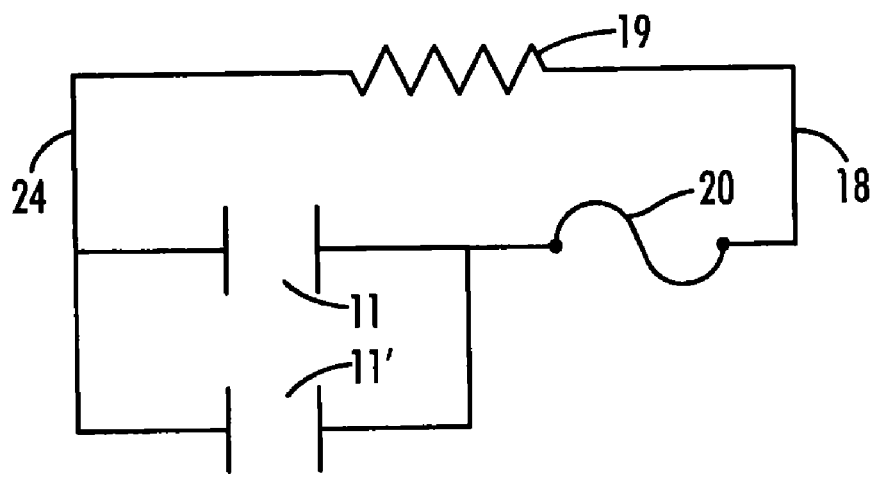
FIG. 21 is an electrical schematic diagram of the embodiment of FIG. 20.

An electrical schematic diagram of the embodiment of FIG. 20 is provided as FIG. 21. In FIG. 21, the capacitors are in parallel with the resistor and fuse is in series with the capacitors and resistor.

Figure 25:
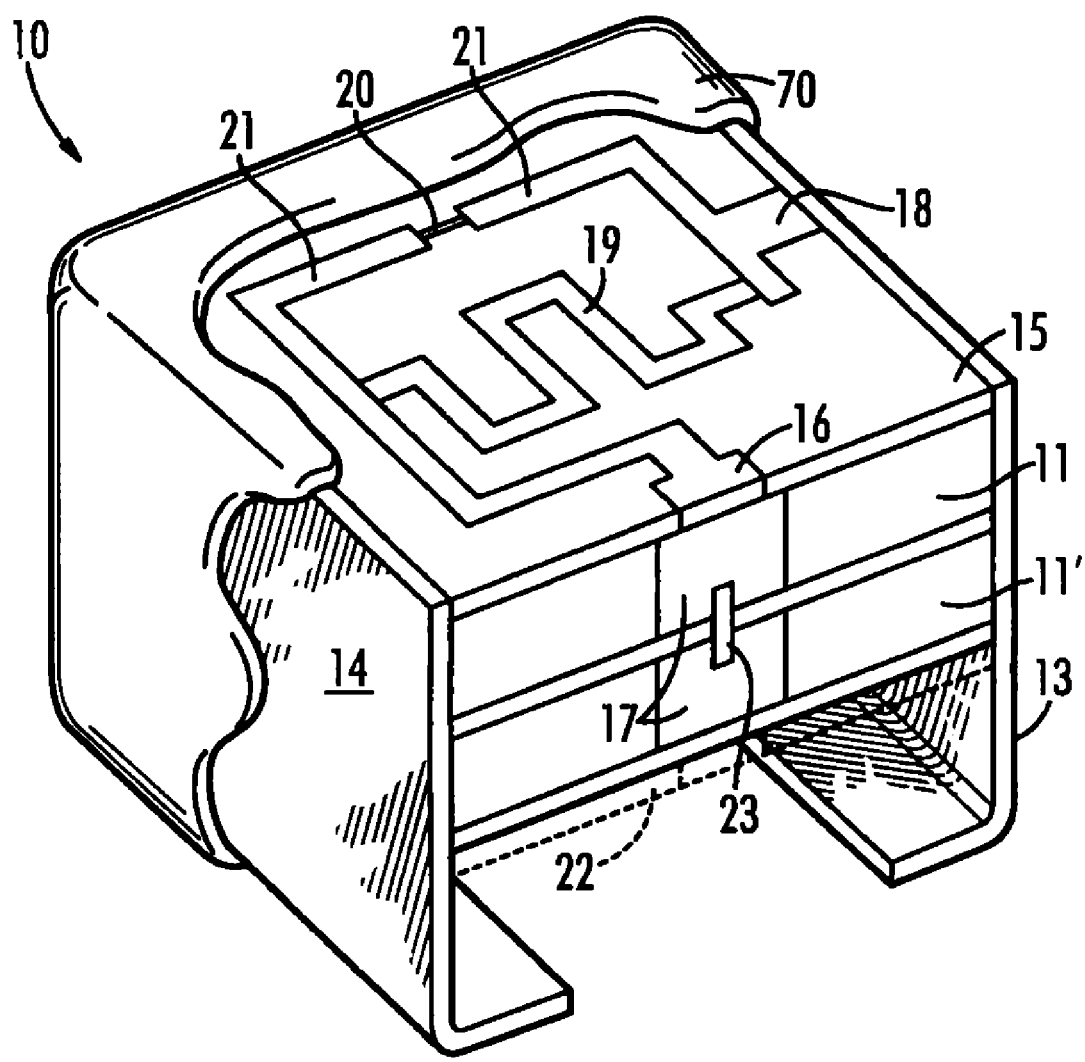
FIG. 25 illustrates an embodiment of the invention.

An embodiment of the invention is illustrated in perspective view is FIG. 25. In FIG. 25, the safe capacitor is generally represented at 10. The safe capacitor comprises at least one capacitive unit, indicated at 11 and 11', the 2 units shown here are stacked one on top of the other. The capacitive units are electrically connected to a first external terminal, 14, and an internal termination, 17, wherein the first external termination and internal termination have opposing polarity. A safe circuit, 15, is located on a surface of the safe capacitor and oriented such that trace terminal, 16, aligns with the internal terminal, 17, and the trace terminal, 18, aligns with the second external terminal 13. As would be realized each internal terminal, 17, of each capacitive unit is in electrical communication with each other internal terminal, 17, by a connector, 23, or by using a solder or conductive epoxy to create an electrical connection between terminals 17 of two or more capacitors 11 and 11'. A thick film resistor, 19, is in a parallel to the capacitor stack. The resistor terminals are terminated at each capacitor terminal 14 and 17. An alternate location for the safe circuit, 15, is shown in phantom view at 22.

The present invention is described primarily based on combinations of resistors and fuses which represents the preferred embodiment. More specifically, the invention is suitable for use with resistive components and conductive components. It is required that a resistive component be parallel to the capacitor since a conductive component would cause a direct short and render the capacitor functionless. For the purposes of the present invention a resistive component has a sufficiently high resistance to prohibit a short across the capacitor at operating voltage. It is more preferred that the resistive component have at least 10% higher resistance than sufficiently high to prohibit a short to protect against electrical anomalies. A conductive component has a resistance with is lower than sufficient to prohibit a short across the capacitor being used. It is most preferred that a conductive circuit have as low a resistance as possible to avoid increasing ESR of the safe capacitor. Particularly preferred resistive components include resistors, varistors, thermistors and the like. Particularly preferred conductive components include fused links and conductors.

A particular advantage of the present invention is the ability to place passive components, most particularly resistors and fuses, on substrates which are then combined with an MLCC or a stack of MLCC's to form a safe capacitor. The present invention utilizes a substrate to create a functional safe circuit that can be incorporated with a single MLCC capacitor or multiple capacitors in a stacked format thereby providing a unique solution to a common problem. The present invention offers a great deal of design flexibility in that different types of safe circuits that can now be incorporated on the substrate and integrated with a capacitor at an affordable cost. One preferred embodiment incorporates a resistor in parallel with a capacitor. Previous art discusses the application of printing or placing the resistor directly to the body of the capacitor, but the present invention offers a unique, cost effective method for accomplishing this, and solves the material compatibility problem that exists with the different technologies as described above.

For specific applications, it is desirable to charge a capacitor prior to use but then have the ability to discharge the capacitor if the charged condition is no longer required. A resistor in parallel with the capacitor achieves this goal. The capacitor can then be charged, but the resistor will allow the capacitor to discharge over a period of time if the charged state is no longer needed. The rate of discharge can be varied by the resistance value of the resistor. By utilizing the safe circuit substrate, this capability can be added to a wide range of capacitors while mitigating the material compatibility problems.

The inventive safe capacitor comprises an integral safe circuit within a discrete package between external terminations. The safe capacitor can be mounted to a circuit trace by any method known for attaching a discrete capacitor to a circuit trace.

The safe circuit of the present invention can be formed on a ceramic substrate with a thick film conductor applied to the substrate along with the various circuit components which are previously described. Formation of a ceramic substrate with circuitry thereon is provided in commonly assigned U.S. Patent Publication Nos. 2006/0114639; 2006/0114640 and 2008/0026136 each of which is incorporated herein by reference.

Figure 22:
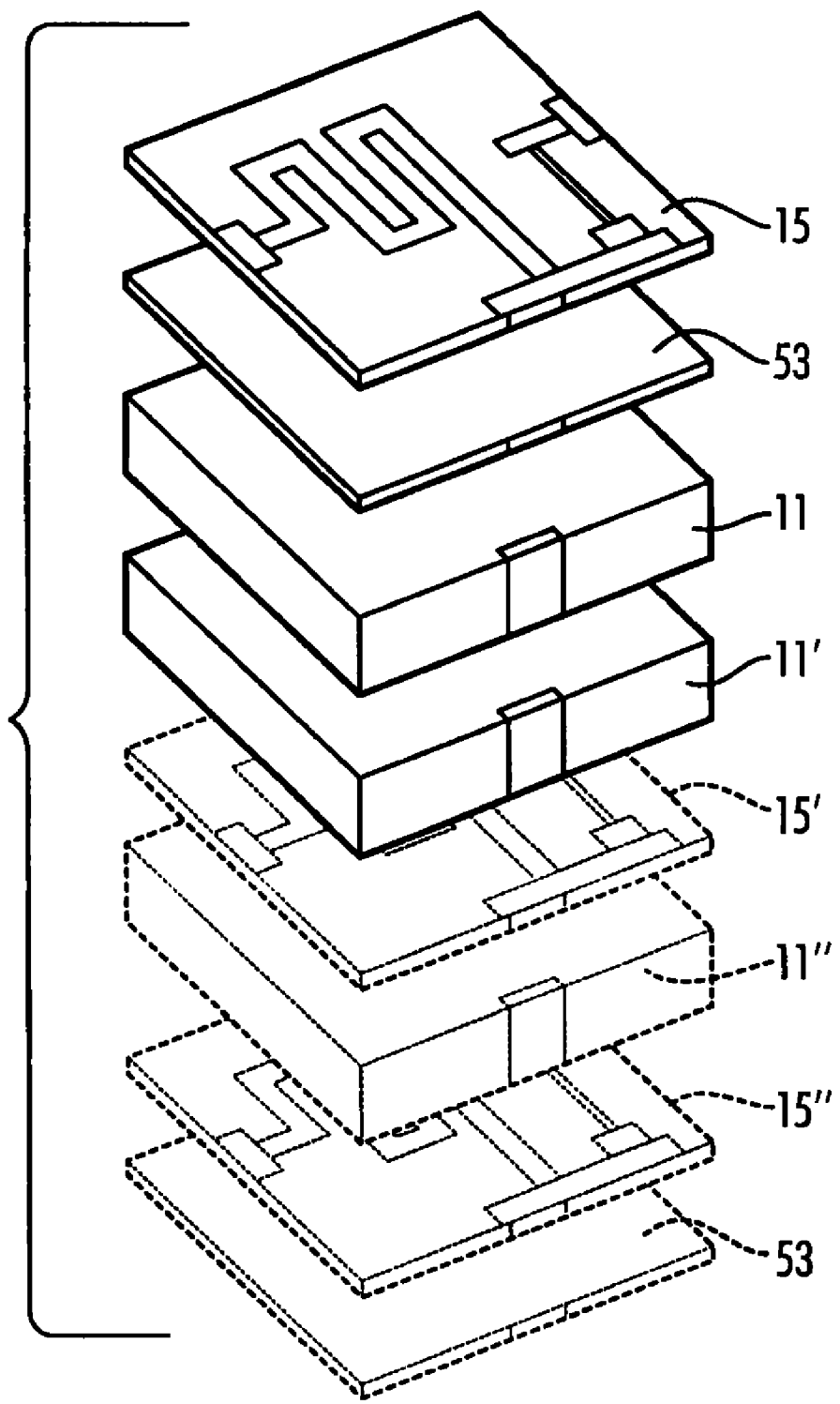
FIG. 22 illustrates an embodiment of the present invention in exploded view.

An exploded view of various embodiments of the invention is illustrated in FIG. 22. In FIG. 22, a safe circuit, 15, is illustrated as having the circuit on the face opposite the capacitors with a cap, 53, between the safe circuit and first capacitive unit, 11. An optional second capacitive unit, 11', is illustrated below capacitive unit, 11. Alternative arrangements are illustrated as shadows. For purposes of discussion the external terminations (not shown) would be attached as described herein. Safe circuit, 15', can be attached below the capacitive units with the circuit on the face closest to the capacitive unit. Alternatively, safe circuit, 15', can be between two capacitive units, 11 and 11'. Additional capacitive units, indicated collectively as 11", can be included with a cap on either end or both ends and either between a safe circuit and capacitive unit or with a safe circuit between the cap and capacitive unit.

Figure 23:
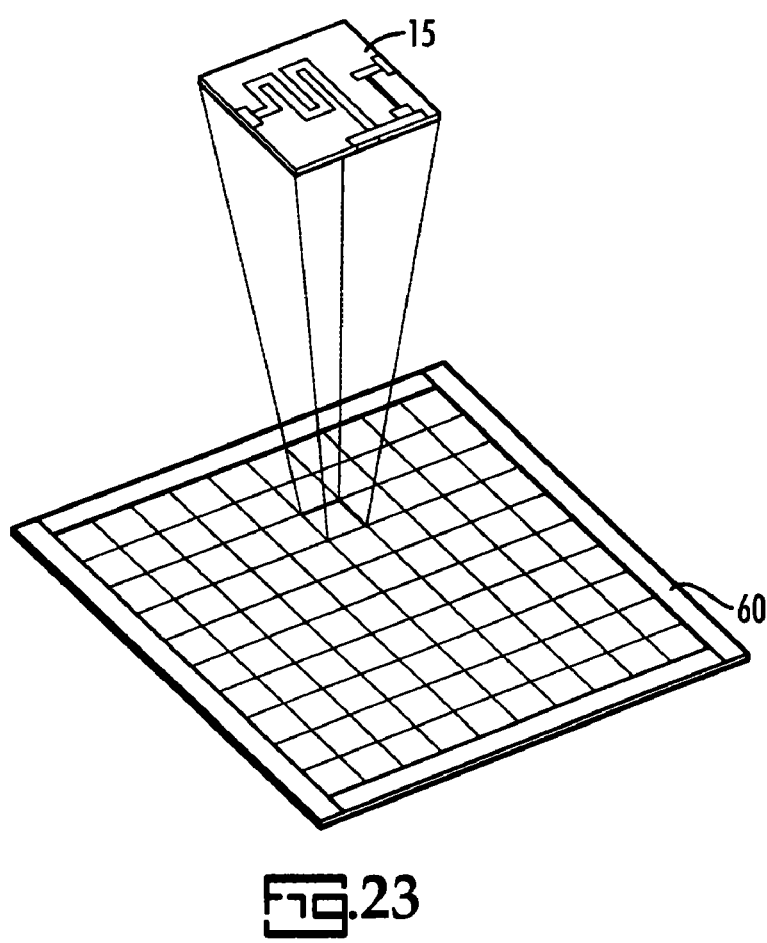
FIG. 23 illustrates a portion of the process for forming the present substrate chip.

A process for forming the safe circuit will be described with reference to FIG. 23. An array of safe circuits, 60, is prepared and the individual safe circuits, 15, are then singulated from the array. As illustrated each circuit is processed in a multiple up array. Illustrated is a 100 up array but the multiple is dependent on circuit size and substrate size preferably being a standard size such as a 5"×7" or 4"×4" for manufacturing conformity. The size and number of circuits on an array is a design choice which is easily altered based on manufacturing facilities. This approach provides for very efficient processing and optimizes thru-put while minimizing tooling and labor costs. Once the array is completed with all of the processing each segment can be singulated into individual circuits and ready for assembly onto a capacitor or a stack of multiple capacitors. Contact pads can be achieved by several machining methods such as laser machining, green punching, or water jetting, a hole on the break line and printing the conductive ink in the hole is well known to those skilled in the art of thick film printing and commonly referred to as a thru-hole print. This technique provides edge and back side metallized pads that can be soldered to the respective capacitor terminals during the assembly process and can eliminate the need for an optional leaded contact (17 FIG. 7) by using solder or a conductive epoxy.

When an overload condition exists, the fuse will open and force the current flow through a high value resistor. This not only protects the capacitor but also protects the circuitry by introducing a high resistance load into the circuit which minimizes further component and or module damage while maintaining a level of circuit functionality.

The safe circuit can also be prepared by a method referred to in the art as Low Temperature Co-fired Ceramics (LTCC) wherein ceramic is metalized while it is in its "green" or unfired state and then laminating several sheets of "green sheets" together and firing the ceramic and metallizations simultaneously. The LTCC technology would produce a substrate with the necessary circuitry and the resistor and fuse to meet the invention's goals. LTCC is most cost effective when applied to high layer count, high density circuits, for high reliability applications. A conductive circuit with resistors and fuses can be generated by adding successive printing, drying, and firing steps on both the front side and the back side of the alumina substrate to create a single or a double sided circuit.

The safe circuit can also be prepared by thin film metallization technologies wherein metal is deposited on a surface by vapor deposition followed by masking, imaging and etching to form the desired connectivity's.

The present invention provides a solution that can be applied to capacitors constructed using either PME or BME metallization systems as well as offering the capability to accommodate greater value added control circuitry in a cost effective approach. This proposed design utilizes current air fireable thick film technology compatible with $Al_2O_3$ substrate materials and high volume cost effective manufacturing techniques. Thick film materials such as, conductive inks, resistors, and glazes can be applied in patterns developed in a screen or stencil and applied by means of a screen printer. Once printed, the thick film materials are then dried and fired to form a functional circuit. This technology also can be used to apply circuitry to both sides of the substrate and electrically interconnecting the top and bottom circuits by utilizing metallized vias extending thru the substrate, thus creating a double sided circuit as they are known by those skilled in the art of hybrid circuits and printed circuit boards.

The substrate is preferably, but not limited to a 96% $Al_2O_3$ (Alumina) substrate of a standard size typically a 3"×3", 4"×4", or 5"×7" for example. The size is not limited by the invention but these sizes are mentioned as conforming to standard manufacturing practice. The large substrate is then designed into a matrix or array, of small segments, as shown in FIG. 23, with each segment being approximately the size of a desired capacitor that will later be singulated from the matrix to become an individual component. This approach allows several individual segments to be processed in an array format that requires minimal tooling and that can be processed on conventional manufacturing equipment thereby providing a cost effective approach since the segments are all processed simultaneously. This approach provides the design engineer the flexibility to use existing material technologies to design circuits with features and capabilities to fit customer's custom applications. Once the array is completed the segments are singulated into individual components by any technique known in the art. Each of these individual segments can then be attached to a capacitor or a stack of capacitors as an assembly process. It is also possible that one or more of these segments can be added to a single capacitor or to a stack of multiple capacitors and can be positioned either on the top, bottom, or in-between capacitors within the stack.

The method of assembly can either be manual or automated. The safe circuit is preferably placed on the top of a two chip stack, but as explained previously the safe circuit can be placed anywhere desirable within the stack and with any number of capacitive units with 1-10 capacitor units in a stack being most preferred.

Figure 24:
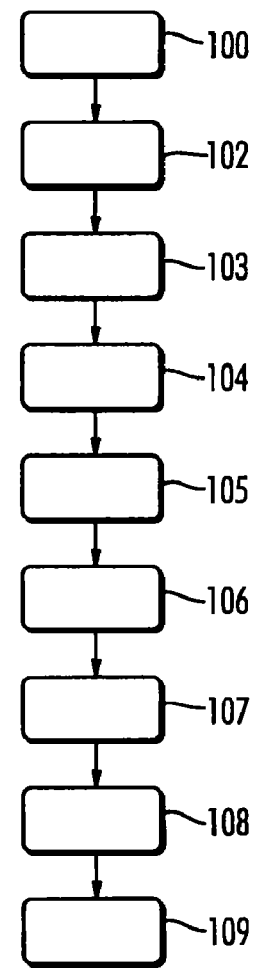
FIG. 24 is a flow chart illustrating the process for forming an embodiment of the invention.

The process for forming a safe capacitor of the present invention will be described with reference to FIG. 24 wherein a flow chart of the procedure is provided. In FIG. 24, at least one capacitive unit is formed, at 100, using either PME or BME technology or combination thereof. The capacitive unit is oriented or placed in a registration nest at 102. If appropriate a second capacitive unit is placed on top of the first capacitive unit at 103 and this process is repeated until the desired number of capacitive units is assembled. A safe circuit is oriented, 104, in the proper location. A bonding material is placed on each lead at 105. The bonding material is preferably a solder alloy or a conductive epoxy without limit thereto. The leads are positioned at 106 and held in position. The bonding material is bonded to the two components at 107. If solder is used, the solder can be reflowed by using a number of technologies selected by user preference but one example could be the use of infra-red heating. If epoxy is used, a convection oven can be utilized to cure the conductive epoxy. Regardless of the interconnect technology utilized, all interconnects are preferably made simultaneously. The fixture is cooled at 108 to allow removal of the device from the fixture. The safe capacitor is finished at 109. Finishing may or may not include encasing in a resin, testing and packaging.

Another important benefit of incorporating the fuse and resistor within the capacitor stack as described is that once assembled the device can be readily coated. Suitable coatings include epoxy or parylene. Applying coatings such as these afford protection for the device from terminal to terminal arcing at higher voltages or from degradation in harsh operating environments of high moisture or humidity.

In addition to the thick film, thin film, and LTCC technologies, substrates constructed from any printed circuit board (PCB's) material. Specifically mentioned are FR-4, G-10, and the CEM 1-5 series substrates, polyimide materials, ceramics and other materials typically used for flex circuits are suitable for use.

Capacitors are used to store electrical energy for providing multiple pulses in detonators. It is critical that these capacitors can discharge rapidly in cases where no detonation is required to prevent an unintended detonation pulse. Rapid discharge is provided by a lower resistance resistor in electrical parallel with the capacitor as described in this invention.

In power circuits capacitors are used to filter out noise and suppress surges from sources such as switches. The ability of capacitors to filter electromagnetic interference (EMI) is also critical when used in safety type applications between power lines (X-type) or from power to ground (Y-type). The capacitors ability to handle a high AC ripple current reliably is important in these applications. Defective capacitors that result in short circuits can cause equipment to shutdown. In safety capacitor applications failures cause equipment to stop if used in an X-type filter between the power lines but if used in a Y-type filter power to ground a failure could result in an electric shock. These types of failures may result because of a voltage spike resulting in dielectric breakdown, either within the defective capacitor or creepage, between the terminals. In the case of ceramic capacitors cracks formed during manufacture or assembly may result in breakdown. Capacitor shorting as a result of these failures can therefore be dangerous and at the very least require expensive replacement of the failed component. Replacement is also required when the capacitors fail open in cases where this results in equipment shutdown. The safety capacitor preferably has leads which help prevent ceramic cracking due to flexure as well as allowing for a coating to prohibit creepage between terminals.

Furthermore it is common for many capacitors to be closely packed together in power supply modules. In these cases a catastrophic capacitor failure may result in damage and subsequent failure of neighboring capacitors. The resulting loss of many capacitors may compromise the equipment. By providing a fuse in series with a stack or individual capacitors if a defective capacitor is present more current will be drawn from the power supply causing this to blow and fail in an open position. Although this high resistance failure may result in increased noise in the circuit it does not shutdown or require immediate replacement. This feature is particularly important in switch mode power supplies and DC-link capacitors that use many capacitors in the circuit module designs. These modules are used in applications such as solar energy storage, hybrid electric vehicles, wind energy, and lighting where the failure of one capacitor module in a long time period, over 5 years, could compromise the equipment. This invention prohibits this from happening.

In particular, the present invention provides a method by which a resistor can be placed in parallel with the capacitor, or a stack of capacitors, to provide a means to rapidly discharge the capacitor in cases where these materials are not readily integrated. This invention also provides a means of combining a fuse in series with a capacitor or capacitors in order to protect a circuit by blowing the fuse so the capacitor fails in an open mode condition not a direct short. It can be seen that by combining a fuse in series with a capacitor and lower resistance resistor parallel to the capacitor in the advent of a capacitor failure the fuse will blow and the resulting energy will be rapidly discharged. The alumina substrate with a thick film resistor and fuse allows the protective circuitry to be adapted to either the PME or BME capacitor material technologies. The substrate is not limited to only a fuse and resistor application. The functionality of the substrate can be increased by adding additional components as either thick film or discrete devices which can be either passive or active as space is available either within the module by placing the components on the substrate or available space between the capacitors or on the bottom of the stack between the capacitor and the circuit board. By adding vias (holes) in the substrate, circuitry can then be added to both sides of the substrate making a double sided substrate with even more functionality. At this point, functionality is only limited to available space on the top and bottom of the substrate.

This invention is not restricted to stacks of multilayer ceramic capacitors. The same layering structure can be applied to film capacitors manufactured with film materials such as polyethyleneterephthalate (PET), polyethyinaphthalate (PEN) and poly(p-phenylene sulfide) (PPS). In this case because these materials cannot survive high temperatures, typically above 250° C., associated with processes such as soldering. The connections between the different capacitors and to the lead frame must use lower temperature processes and materials such as spot welding and conductive epoxies. Furthermore, this invention is not restricted to capacitors that use a multilayer structure. By forming the 3-terminal or higher structure on a tantalum capacitor stacks of these can be incorporated with resistors, fuses, circuitry and other discrete components.

The resistor or resistors in parallel to the capacitor stack are chosen to have a lower resistance than the capacitor and is capable of retaining this resistance well above the maximum power capable of being supplied in the application circuit. The value of the resistor or resistors is selected according to the discharge time desired, the lower the resistance the higher the rate of discharge but typically a minimum value of 100 M ohms would be used. The fuse is chosen based on the maximum working current supplied to the device in the application circuit under normal operational conditions so that it is capable of blowing once this maximum power is exceeded. In the case of AC ripple current a fuse at least ⅛ the maximum ripple current is used. By example, for 24 Arms (Amps root mean squared) a fuse rated at 3 amps or greater for the working temperature range of the application circuit would be required. In this way a capacitor failure resulting in an excessive power surge in the safety stack causes the fuse to blow and the unit fails in a highly resistive state.

Thick film materials are typically employed for electronic grade ceramics such as 96% $Al_2O_3$ or similar glass based oxide systems including beryllium oxide (BeO) and aluminum nitride for example. The conductive inks are preferably palladium silver metal systems and the resistors from ruthenium oxide fired in the range of 600° C. to 850° C. in air.

The invention has been described with particular emphasis on the preferred embodiments without limit thereto. One of skill in the art would realize additional embodiments, alterations and improvements which are not enumerated but which are within the scope of the claims appended hereto.

The invention claimed is:

1. A safe capacitor comprising:
   a first external termination and a second external termination;
   at least one capacitive unit comprising a first conductor and a second conductor wherein said first conductor is electrically connected to said first external termination and said second conductor is electrically connected to said second external termination; and
   at least one safe circuit comprising a first contact pad and a second contact pad with a resistive electronic component electrically connected between said first contact pad and said second contact pad wherein said first contact pad is in electrical contact with said first external termination and said second contact pad is in electrical contact with said second external termination further comprising an internal termination with the capacitive unit connected between said first external termination and said internal termination and electrically connected between said second external termination and said internal termination.

2. The safe capacitor of claim 1 wherein said electrical connectivity comprises at least one component selected from the group consisting of a resistive electronic component and a conductive electronic component.

3. The safe capacitor of claim 2 wherein said electrical connectivity comprises a component selected from a fuse and a resistor.

4. The safe capacitor of claim 1 wherein said resistive electronic component is selected from the group consisting of resistor, thermistor, and a varistor.

5. The safe capacitor of claim 1 wherein said conductive component is selected from a conductor, fused link, inductor, balun, diode, FET (field effect transistor) and any other semiconductor device.

6. The safe capacitor of claim 1 wherein the external terminations are surface mount, leaded surface mount or through-hole leads.

7. The safe capacitor of claim 1 wherein said safe circuit is positioned on top, between or on the bottom of the capacitive units.

8. The safe capacitor of claim 1 wherein said capacitor element comprises no more than 10 capacitive units.

9. The safe capacitor of claim 1 wherein said safe circuit comprises a substrate with at least one of said fuse and or said resistor thereon.

10. The safe capacitor of claim 9 wherein said safe circuit substrate is selected from ceramic, printed circuit board and flexible circuit materials.

11. The safe capacitor of claim 10 wherein said safe circuit substrate is a ceramic selected from alumina, BeO, ALN or glass-ceramic formulation suitable for low temperature co-fired ceramic (LTCC).

12. The safe capacitor of claim 9 wherein said safe circuit is attached to said capacitor element with at least one of said resistor and said fuse between said substrate and said capacitive element.

13. The safe capacitor of claim 9 wherein said substrate has a circuit on at least one side.

14. The safe capacitor of claim 13 wherein said substrate has a circuit on at least two sides.

15. The safe capacitor of claim 1 further comprising
an encasement over a portion of said safe capacitor.

16. The safe capacitor of claim 1 wherein multiple capacitor units are connected through the internal termination.

17. The safe capacitor of claim 1 wherein multiple capacitor units are connected to individual safe circuits through their internal terminations.

18. The safe capacitor of claim 1 wherein the internal terminations of multiple capacitor units are each connected together also to a safe circuit.

19. The safe capacitor of claim 1 where more than one internal termination is present.

20. A method for manufacturing a safe capacitor of claim 1 comprising forming said safe circuit on a substrate by a method selected from thin film technology, thick film technology and LTCC to produce a circuitry comprising at least one component selected from a fuse and a resistor.

21. An electrical circuit comprising the safe capacitor of claim 1.

22. A safe capacitor comprising:
a first external termination and a second external termination;
at least one capacitive unit comprising a first conductor and a second conductor wherein said first conductor is electrically connected to said first external termination and said second conductor is electrically connected to an internal termination; and
at least one safe circuit comprising a first contact pad and a second contact pad with a component electrically connected between said first contact pad and said second contact pad wherein said first contact pad is in electrical contact with said second external termination and said second contact pad is in electrical contact with said internal termination.

23. The safe capacitor of claim 22 wherein said component is selected from a fuse and a resistor.

24. The safe capacitor of claim 22 wherein said component is selected from the group consisting of a conductor, fused link, inductor, balun, diode, resistor, thermistor, varistor, FET (field effect transistor) and any other semi-conductor device.

25. The safe capacitor of claim 22 wherein the external terminations are surface mount, leaded surface mount or through-hole leads.

26. The safe capacitor of claim 22 wherein said safe circuit is positioned on top, between or on the bottom of the capacitive units.

27. The safe capacitor of claim 22 wherein said capacitor element comprises no more than 10 capacitive units.

28. The safe capacitor of claim 22 where containing more than one internal termination.

29. The safe capacitor of claim 22 further comprising an encasement over a portion of said safe capacitor.

30. A method for manufacturing a safe capacitor of claim 22 comprising forming said safe circuit on a substrate by a method selected from thin film technology, thick film technology and LTCC to produce a circuitry comprising at least one component selected from a fuse and a resistor.

31. The safe capacitor of claim 22 wherein said safe circuit comprises a substrate with at least one of said fuse and or said resistor thereon.

32. The safe capacitor of claim 31 wherein said safe circuit substrate is selected from ceramic, printed circuit board and flexible circuit materials.

33. The safe capacitor of claim 32 wherein said safe circuit substrate is a ceramic selected from alumina, BeO, AlN or glass-ceramic formulation suitable for low temperature co-fired ceramic (LTCC).

34. The safe capacitor of claim 31 wherein said safe circuit is attached to said capacitor element with at least one of said resistor and said fuse between said substrate and said capacitive element.

35. The safe capacitor of claim 31 wherein said substrate has a circuit on at least one side.

36. The safe capacitor of claim 35 wherein said substrate has a circuit on at least two sides.

37. The safe capacitor of claim 22 wherein multiple capacitor units are connected through the internal termination.

38. The safe capacitor of claim 22 wherein multiple capacitor units are connected to individual safe circuits through their internal terminations.

39. The safe capacitor of claim 22 wherein the internal terminations of multiple capacitor units are each connected together also to a safe circuit.

40. An electrical circuit comprising the safe capacitor of claim 22.

* * * * *